(12) United States Patent
Shioya (10) Patent No.: US 8,073,260 B2
(45) Date of Patent: Dec. 6, 2011

(54) IMAGE PROCESSING APPARATUS AND METHOD, AND PROGRAM

(75) Inventor: Hiroyuki Shioya, Kanagawa (JP)

(73) Assignee: Sony Corporation, Tokyo (JP)

( * ) Notice: Subject to any disclaimer, the term of this patent is extended or adjusted under 35 U.S.C. 154(b) by 850 days.

(21) Appl. No.: 12/110,856

(22) Filed: Apr. 28, 2008

(65) Prior Publication Data

US 2008/0279457 A1 Nov. 13, 2008

(30) Foreign Application Priority Data

May 10, 2007 (JP) ................................ P2007-125990

(51) Int. Cl.
*G06K 9/00* (2006.01)
(52) U.S. Cl. ........................................ 382/191; 356/326
(58) Field of Classification Search .................. 382/191; 356/326
See application file for complete search history.

(56) References Cited

U.S. PATENT DOCUMENTS

| 2001/0052977 | A1* | 12/2001 | Toyooka | 356/326 |
| 2002/0135752 | A1* | 9/2002 | Sokolov et al. | 356/39 |
| 2006/0115176 | A1* | 6/2006 | Kanamori et al. | 382/266 |

FOREIGN PATENT DOCUMENTS

JP 2005-167444 6/2005

* cited by examiner

*Primary Examiner* — Wesley Tucker
(74) *Attorney, Agent, or Firm* — Finnegan, Henderson, Farabow, Garrett & Dunner, L.L.P.

(57) ABSTRACT

An image processing apparatus includes a pattern generating unit that generates a plurality of two-dimensional array patterns, a radiating unit that emits light in each of the two-dimensional array patterns generated by the pattern generating unit to irradiate an object with the light, a spectrum measuring unit that measures the spectrum of the light, which is emitted from the radiating unit and is reflected by the object, in a plurality of frequency bands to generate spectral data, a transmission-rate calculating unit that calculates the transmission rate of each frequency band on the basis of the two-dimensional array patterns and spectral data blocks associated with the respective two-dimensional array patterns, and an image generating unit that generates an image in a desired frequency band on the basis of the transmission rates calculated by the transmission-rate calculating unit.

6 Claims, 10 Drawing Sheets

IMAGE PROCESSING APPARATUS AND METHOD, AND PROGRAM

CROSS REFERENCES TO RELATED APPLICATIONS

The present invention contains subject matter related to Japanese Patent Application JP 2007-125990 filed in the Japanese Patent Office on May 10, 2007, the entire contents of which are incorporated herein by reference.

BACKGROUND OF THE INVENTION

1. Field of the Invention

The present invention relates to apparatuses and methods for image processing and programs and, more particularly, to an image processing apparatus and method capable of generating an image having spectral characteristics, and a program.

2. Description of the Related Art

An image has generally been captured in three bands of red, green, and blue (RGB).

In recent years, the necessity of multiband imaging has increased. In particular, multiband imaging is needed for security and medical fields requiring nondestructive and noninvasive inspection.

The use of multiband imaging enables capture of an image (hereinafter, "spectral image") having spectral characteristic information for each pixel.

According to a multiband imaging technique, a plurality of bandpass filters are mechanically selected and are arranged in front of a camera, and the intensities of light components passing through the respective bandpass filters are observed using an image. Japanese Unexamined Patent Application Publication No. 2005-167444 discloses an example of this technique.

SUMMARY OF THE INVENTION

However, the above-described technique needs mechanical operation time depending on the number of bandpass filters since the filters are mechanically changed. Reducing the mechanical operation time results in a trade-off between the mechanical operation time and the cost of equipment. Accordingly, the cost may increase.

Typical high-performance diffraction grating spectroscopes each include a single photodetector. Since a high-performance spectroscope including an array of photodetectors is difficult to get, the use of this type of spectroscope is not practical.

The present invention is made in consideration of the above-described circumstances. It is desirable to generate multiband images using a single photodetector.

According to an embodiment of the present invention, an image processing apparatus includes the following elements. A pattern generating unit generates a plurality of two-dimensional array patterns. A radiating unit emits light in each of the two-dimensional array patterns generated by the pattern generating unit to irradiate an object with the light. A spectrum measuring unit measures the spectrum of the light, which is emitted from the radiating unit and is reflected by the object, in a plurality of frequency bands to generate spectral data. A transmission-rate calculating unit calculates the transmission rate of each frequency band on the basis of the two-dimensional array patterns and spectral data blocks associated with the respective two-dimensional array patterns. An image generating unit generates an image in a desired frequency band on the basis of the transmission rates calculated by the transmission-rate calculating unit.

The transmission-rate calculating unit may calculate the transmission rate of each frequency band using a least-squares method on the basis of the two-dimensional array patterns and spectral images corresponding to the respective two-dimensional array patterns.

The radiating unit may sequentially emit light in the two-dimensional array patterns generated by the pattern generating unit in order of decreasing importance to irradiate the object with the light.

According to another embodiment of the present invention, there is provided a method for image processing. The method includes the steps of generating a plurality of two-dimensional array patterns, emitting light in each of the two-dimensional array patterns to irradiate an object with the light, measuring the spectrum of the light, which is emitted and is then reflected by the object, in a plurality of frequency bands to generate spectral data, calculating the transmission rate of each frequency band on the basis of the two-dimensional array patterns and spectral data blocks associated with the respective two-dimensional array patterns, and generating an image in a desired frequency band on the basis of the calculated transmission rates.

According to another embodiment of the present invention, there is provided a program that allows a computer to perform a process including the steps of generating a plurality of two-dimensional array patterns, emitting light in each of the two-dimensional array patterns to irradiate an object with the light, measuring the spectrum of the light, which is emitted and is then reflected by the object, in a plurality of frequency bands to generate spectral data, calculating the transmission rate of each frequency band on the basis of the two-dimensional array patterns and spectral data blocks associated with the respective two-dimensional array patterns, and generating an image in a desired frequency band on the basis of the calculated transmission rates.

According to another embodiment of the present invention, there is provided a program storage medium that stores the program according to the above-described embodiment.

The image processing apparatus according to the embodiment of the present invention may be an independent apparatus, or may be a block for performing image processing.

According to each of the embodiments of the present invention, multiband images can be generated using a single photodetector.

DESCRIPTION OF THE PREFERRED EMBODIMENTS

Before describing an embodiment of the present invention, the correspondence between aspects of the present invention described in the specification and embodiments of the present invention is discussed below. This description is intended to assure that embodiments supporting the claimed invention are described in this specification. Thus, even if an embodiment in the following embodiments is not described as relating to a certain aspect of the present invention, that does not necessarily mean that the embodiment does not relate to that aspect of the present invention. Conversely, even if an embodiment is described herein as relating to a certain aspect of the present invention, that does not necessarily mean that the embodiment does not relate to other aspects of the present invention.

Furthermore, this description should not be construed as restricting that all the aspects of the invention disclosed in the embodiments are described in the specification. That is, the description does not deny the existence of aspects of the present invention that are described in this specification but not claimed in the invention of this application, i.e., the existence of aspects of the present invention that in future may be claimed by a divisional application, or that may be additionally claimed through amendments.

According to an embodiment of the present invention, an image processing apparatus includes the following elements. A pattern generating unit (e.g., a pattern control unit 21 in FIG. 2) generates a plurality of two-dimensional array patterns. A radiating unit (e.g., a projector 14 in FIG. 2) emits light in each of the two-dimensional array patterns generated by the pattern generating unit to irradiate an object with the light. A spectrum measuring unit (e.g., a spectrum measurement unit 15 in FIG. 2) measures the spectrum of the light, which is emitted from the radiating unit and is reflected by the object, in a plurality of frequency bands to generate spectral data. A transmission-rate calculating unit (e.g., a transmission-rate calculation unit 24 in FIG. 2) calculates the transmission rate of each frequency band on the basis of the two-dimensional array patterns and spectral data blocks associated with the respective two-dimensional array patterns. An image generating unit (e.g., an image generation unit 25 in FIG. 2) generates an image in a desired frequency band on the basis of the transmission rates calculated by the transmission-rate calculating unit.

The transmission-rate calculating unit (e.g., the transmission-rate calculation unit 24 in FIG. 2) may calculate the transmission rate of each frequency band using a least-squares method on the basis of the two-dimensional array patterns and spectral images corresponding to the respective two-dimensional array patterns.

The radiating unit (e.g., the projector 14 in FIG. 2) may sequentially emit light in the two-dimensional array patterns generated by the pattern generating unit in order of decreasing importance to irradiate the object with the light.

Another embodiment of the present invention provides a method for image processing. The method includes the steps of generating a plurality of two-dimensional array patterns (for example, step S3 in FIG. 6), emitting light in each of the two-dimensional array patterns to irradiate an object with the light (for example, step S4 in FIG. 6), measuring the spectrum of the light, which is emitted and is then reflected by the object, in a plurality of frequency bands to generate spectral data (for example, step S5 in FIG. 6), calculating the transmission rate of each frequency band on the basis of the two-dimensional array patterns and spectral data blocks associated with the respective two-dimensional array patterns (for example, step S9 in FIG. 6), and generating an image in a desired frequency band on the basis of the calculated transmission rates (for example, step S10 in FIG. 6).

Figure 6:
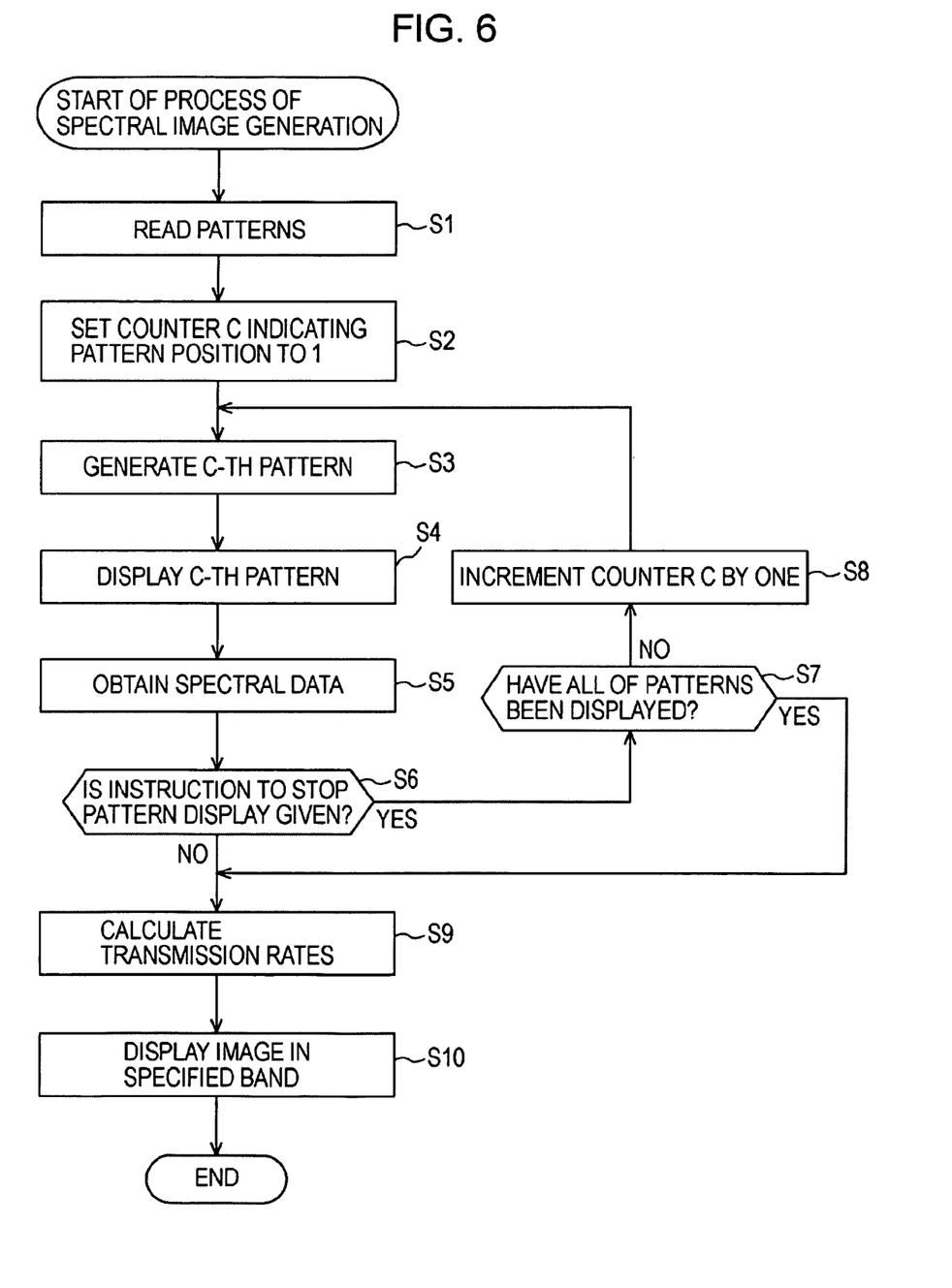
FIG. 6 is a flowchart of a process of spectral image generation by the information processing apparatus in FIG. 1.

Another embodiment of the present invention provides a program that allows a computer to execute a process including the steps of generating a plurality of two-dimensional array patterns (for example, step S3 in FIG. 6), emitting light in each of the two-dimensional array patterns to irradiate an object with the light (for example, step S4 in FIG. 6), measuring the spectrum of the light, which is emitted and is then reflected by the object, in a plurality of frequency bands to generate spectral data (for example, step S5 in FIG. 6), calculating the transmission rate of each frequency band on the basis of the two-dimensional array patterns and spectral data blocks associated with the respective two-dimensional array patterns (for example, step S9 in FIG. 6), and generating an image in a desired frequency band on the basis of the calculated transmission rates (for example, step S10 in FIG. 6).

Figure 1:
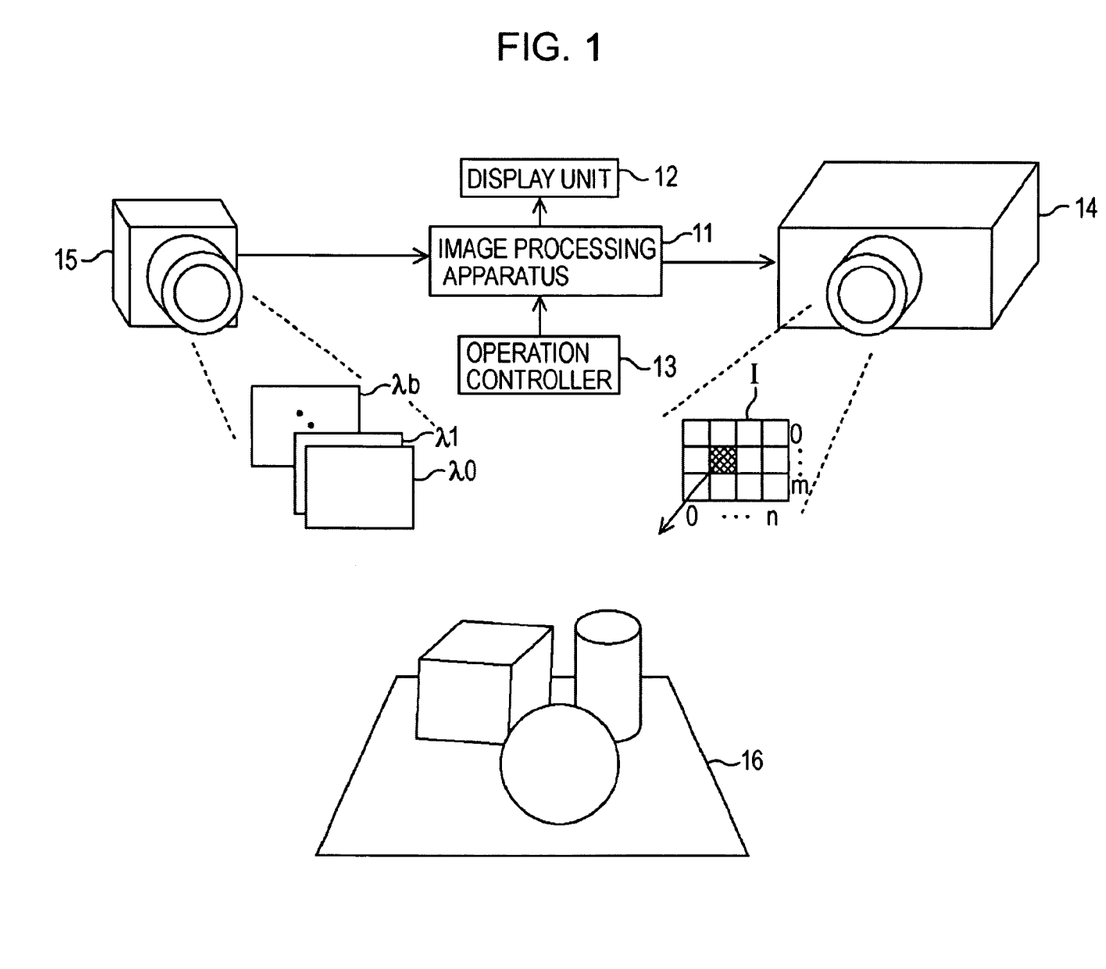
FIG. 1 is a diagram illustrating an arrangement of an image processing apparatus according to an embodiment of the present invention.

FIG. 1 illustrates an image processing apparatus according to an embodiment of the present invention, the apparatus generating an image having spectral characteristics.

Referring to FIG. 1, the image processing apparatus, indicated at 11, controls a projector 14 including a light source I having a two dimensional array of pixels of (1+m) rows×(1+n) columns. The image processing apparatus 11 sequentially changes light emission patterns of the pixels in the light source I to irradiate an object 16 with light. The projector 14 is fixed in a predetermined position and direction so that the object 16 can be brightly irradiated with light emitted from the pixels.

In addition, the image processing apparatus 11 controls a spectrum measurement unit 15 to measure the spectrum of light that is emitted from the projector 14 and is reflected by the object 16, thus obtaining the light intensities $\lambda 0$ to $\lambda b$ of a plurality bands. The spectrum measurement unit 15 does not necessarily need an array of photodetectors for the respective bands. A single photodetector may be used. The spectrum measurement unit 15 is fixed in a predetermined position and direction so as to directly or indirectly receive light reflected by the object 16.

The "bands" mean predetermined continuous wavelength regions constituting light. For example, when the spectrum of visible light ranging from 380 to 780 nm is divided in units of 10 nm, the spectrum is divided into 40 regions. Each band corresponds to a region of 10 nm. In this case, the spectrum is divided into 40 bands. In the following description, data describing the light intensities of respective bands obtained in one image capture (i.e., the light intensities $\lambda 0$ to $\lambda b$ of the respective bands in one light emission pattern of the projector 14) will be called "spectral data".

The image processing apparatus 11 stores spectral data blocks, obtained by measuring a plurality of light emission patterns as described above, in association with the respective light emission patterns. In this instance, the light emission patterns and the spectral data blocks satisfy the relationship expressed by the following Expression (1).

[Expression 1]

$$\left[\begin{pmatrix} C_0 \\ \vdots \\ C_j \\ \vdots \\ C_b \end{pmatrix}_0 \begin{pmatrix} C_0 \\ \vdots \\ C_j \\ \vdots \\ C_b \end{pmatrix}_1 \cdots \begin{pmatrix} C_0 \\ \vdots \\ C_j \\ \vdots \\ C_b \end{pmatrix}_s\right] = \quad (1)$$

$$\begin{pmatrix} A_{0,0} & \cdots & A_{0,i} & \cdots & A_{0,mn} \\ \vdots & \ddots & & \ddots & \vdots \\ A_{j,0} & & A_{j,i} & & A_{j,mn} \\ \vdots & \ddots & & \ddots & \vdots \\ A_{b,0} & \cdots & A_{b,i} & \cdots & A_{b,mn} \end{pmatrix} \left[\begin{pmatrix} P_0 \\ \vdots \\ P_i \\ \vdots \\ P_{mn} \end{pmatrix}_0 \begin{pmatrix} P_0 \\ \vdots \\ P_i \\ \vdots \\ P_{mn} \end{pmatrix}_1 \cdots \begin{pmatrix} P_0 \\ \vdots \\ P_i \\ \vdots \\ P_{mn} \end{pmatrix}_s\right]$$

In Expression (1), the matrix in the left side indicates the results of measurement, represented by column vectors corresponding to S light emission patterns in the projector 14. In each column vector, elements $C_0$ to $C_b$ correspond to the light intensities $\lambda 0$ to $\lambda b$ of the respective bands. In the right side, the left matrix with elements $A_{0,0}$ to $A_{b,mn}$ of (1+mn) columns×(1+b) rows is a matrix representing the rates of transmission (hereinafter, transmission rates). Furthermore, the right matrix in the right side represents S light emission patterns in the projector 14. Each pattern corresponds to a column vector including the light intensities $P_0$ to $P_{mn}$ of the respective pixels. In other words, it is assumed in Expression (1) that image capture has been performed S times using S different light emission patterns.

In the following description, the matrix in the left side of Expression (1) will be called "matrix C", the left matrix in the right side will be called "matrix A", and the right matrix in the right side will be called "matrix P". Accordingly, Expression (1) may be expressed as the following Expression (2).

[Expression 2]

$$C = AP \quad (2)$$

The image processing apparatus 11 obtains the transmission rates A using the relationship expressed by the above-described Expression (2) to generate an object image in any band.

Since the matrix P in Expression (2) is not a square matrix, the image processing apparatus 11 obtains an inverse matrix $P^{-1}$ in a pseudo manner using, for example, a least-squares method and multiplies both the sides by the inverse matrix $P^{-1}$, thereby obtaining the matrix A expressed as the following Expression (3), i.e., the transmission rates A.

[Expression 3]

$$A = C\tilde{P}^{-1} \quad (3)$$

Furthermore, the image processing apparatus 11 produces the transpose $A^t$ of the matrix A representing the transmission rates A and multiplies the transpose $A^t$ by a vector $C_v'$, in which only the element corresponding to a band specified by an operation controller 13 is expressed as a value other than zero, thereby generating an image $P_v'$ in any band that is captured through the projector 14, serving as a camera, using the spectrum measurement unit 15, serving as a light source. The image processing apparatus 11 displays the image $P_v'$ on a display unit 12, such as a cathode ray tube (CRT) or a liquid crystal display.

[Expression 4]

$$\vec{P}' = A^t \vec{C}' \quad (4)$$

Figure 2:
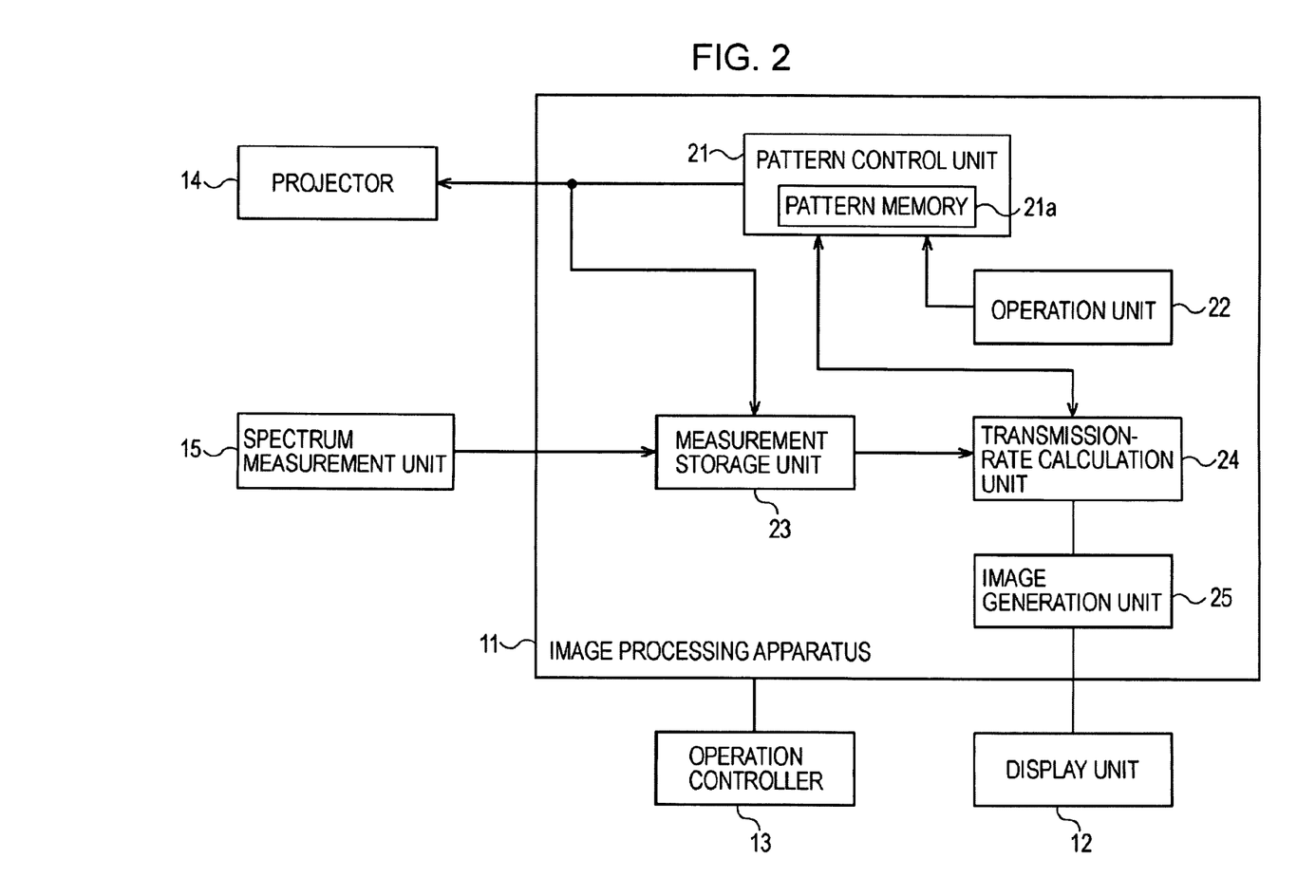
FIG. 2 is a diagram showing the structure of the information processing apparatus in FIG. 1.

The structure of the image processing apparatus 11 according to the present embodiment will now be described with reference to FIG. 2.

The image processing apparatus 11 includes a pattern control unit 21, an operation unit 22, a measurement storage unit 23, a transmission-rate calculation unit 24, and an image generation unit 25.

The pattern control unit 21 reads stored light emission patterns of pixels 32 (see FIG. 3) in the projector 14 from a pattern memory 21a and allows the projector 14 to sequentially emit light in the light emission patterns from the pixels 32 in a predetermined order. In addition, the pattern control unit 21 supplies those light emission patterns as information to the measurement storage unit 23.

The operation unit 22 includes, for example, a keyboard and buttons. The operation unit 22 is operated to stop a process of sequentially changing the light emission patterns to emit light in the changed pattern.

The measurement storage unit 23 stores spectral data blocks, regarding the results of measurement by the spectrum measurement unit 15, in association with the light emission patterns supplied from the pattern control unit 21.

The transmission-rate calculation unit 24 obtains the transmission rates A on the basis of the spectral data blocks and the light emission patterns stored in the measurement storage unit 23 using the least-squares method as described above.

The image generation unit 25 obtains the transpose $A^t$ on the basis of the transmission rates A obtained by the transmission-rate calculation unit 24. The image generation unit 25 generates an image in a specified band, input from the operation controller 13, using the arithmetic operation of the above-described Expression (4). The image generation unit 25 displays the generated image on the display unit 12.

Figure 3:
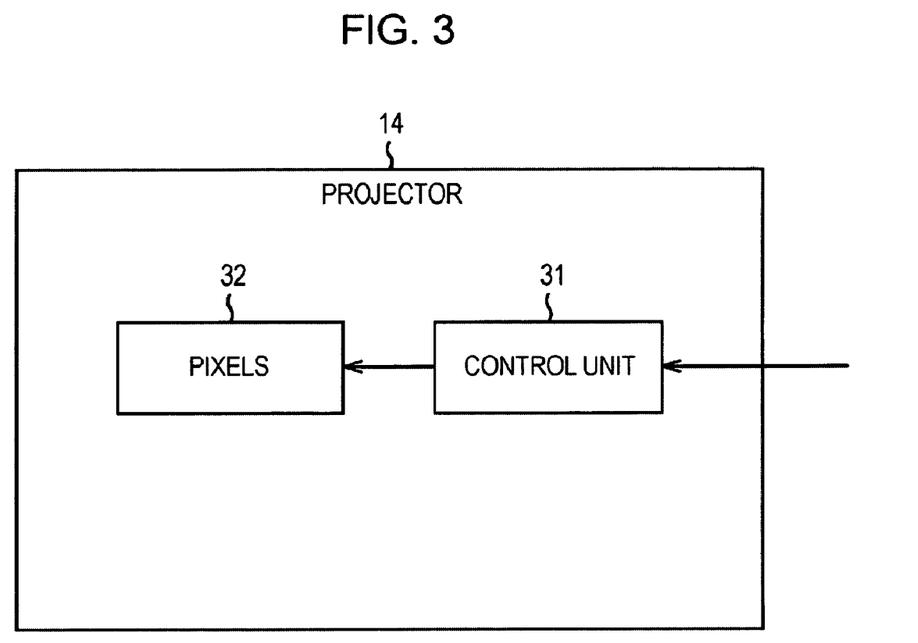
FIG. 3 is a diagram of the structure of a projector in FIG. 1.

The structure of the projector 14 in accordance with the present embodiment will now be described with reference to FIG. 3.

The projector 14 includes a control unit 31. The control unit 31 receives information regarding light emission patterns from the image processing apparatus 11. In addition, the control unit 31 controls the pixels 32 of (1+m) rows×(1+n) columns in accordance with the light emission patterns in the received information to emit light, thus irradiating the object 16 with light.

Figure 4:
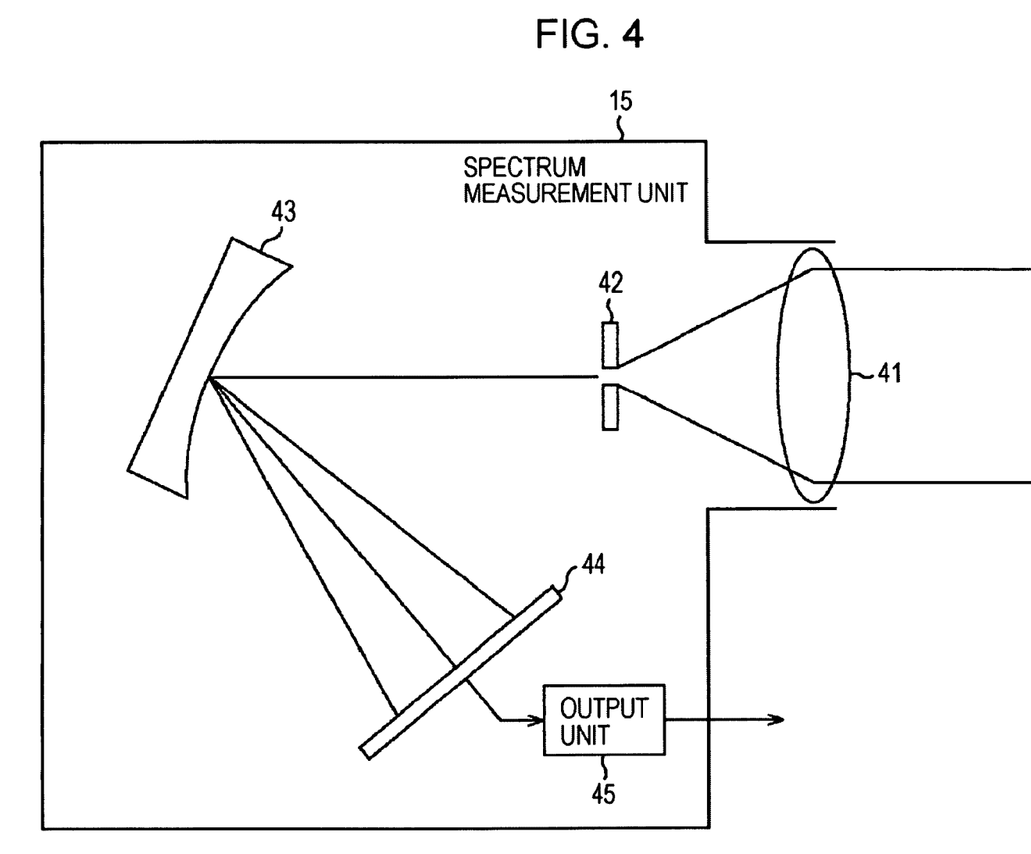
FIG. 4 is a diagram of the structure of a spectrum measurement unit in FIG. 1.

The structure of the spectrum measurement unit 15 in accordance with the present embodiment will now be described with reference to FIG. 4.

A lens 41 focuses light entering the lens 41 onto a slit 42. The slit 42 guides the light to a concave grating (diffraction grating) 43. The concave grating 43 separates the guided light into a plurality of wavelength bands and reflects light components to a sensor 44.

Figure 5:
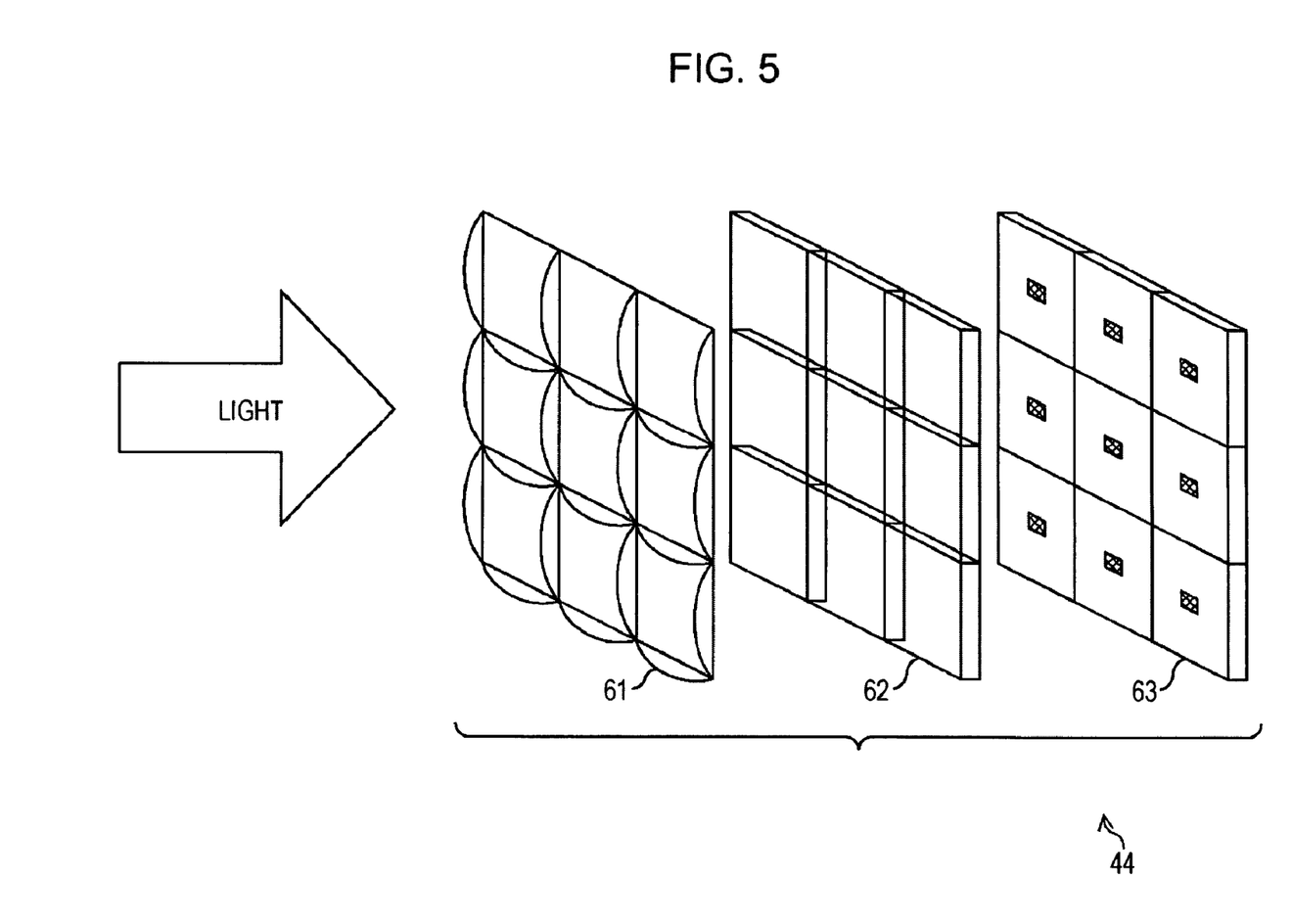
FIG. 5 is a diagram of the structure of a sensor in FIG. 4.

The sensor 44 includes a fly's eye lens 61, a filter array 62, and a photodiode array 63, as shown in FIG. 5. The fly's eye lens 61 transmits light so that respective photodiodes of the photodiode array 63 can receive the light in the same field of view. The filter array 62 includes segments having different spectral absorptances such that the absorption spectra of the adjacent segments are perpendicular to each other. The photodiode array 63 converts the light intensity of each band of received light into an intensity signal and outputs the signal to an output unit 45. The output unit 45 generates spectral data from those intensity signals and outputs the data to the image processing apparatus 11.

At least one photodiode may be arranged for each band.

A process of spectral image generation will now be described with reference to a flowchart of FIG. 6.

In step S1, the pattern control unit 21 reads stored light emission patterns of the pixels 32 (refer to FIG. 3) from the pattern memory 21a.

Figure 7:
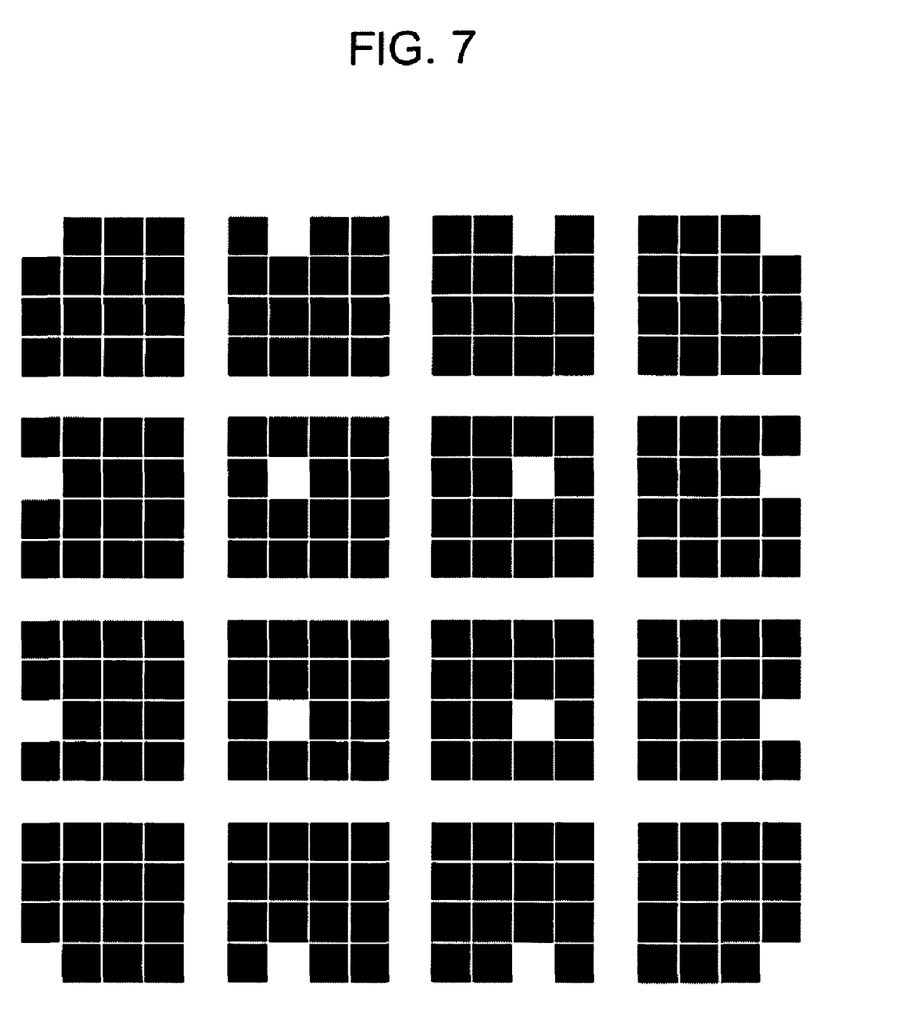
FIG. 7 is a diagram explaining an example of light emission patterns of the projector in FIG. 1.

As for the light emission patterns stored in the pattern memory 21a of the pattern control unit 21, for example, 16 patterns shown in FIG. 7 may be used. In each of the patterns, only one of the pixels emits light. In FIG. 7, (m+1)=(n+1)=4. A white square represents a light-emitting pixel and black squares each represent a pixel that does not emit light.

Figure 8:
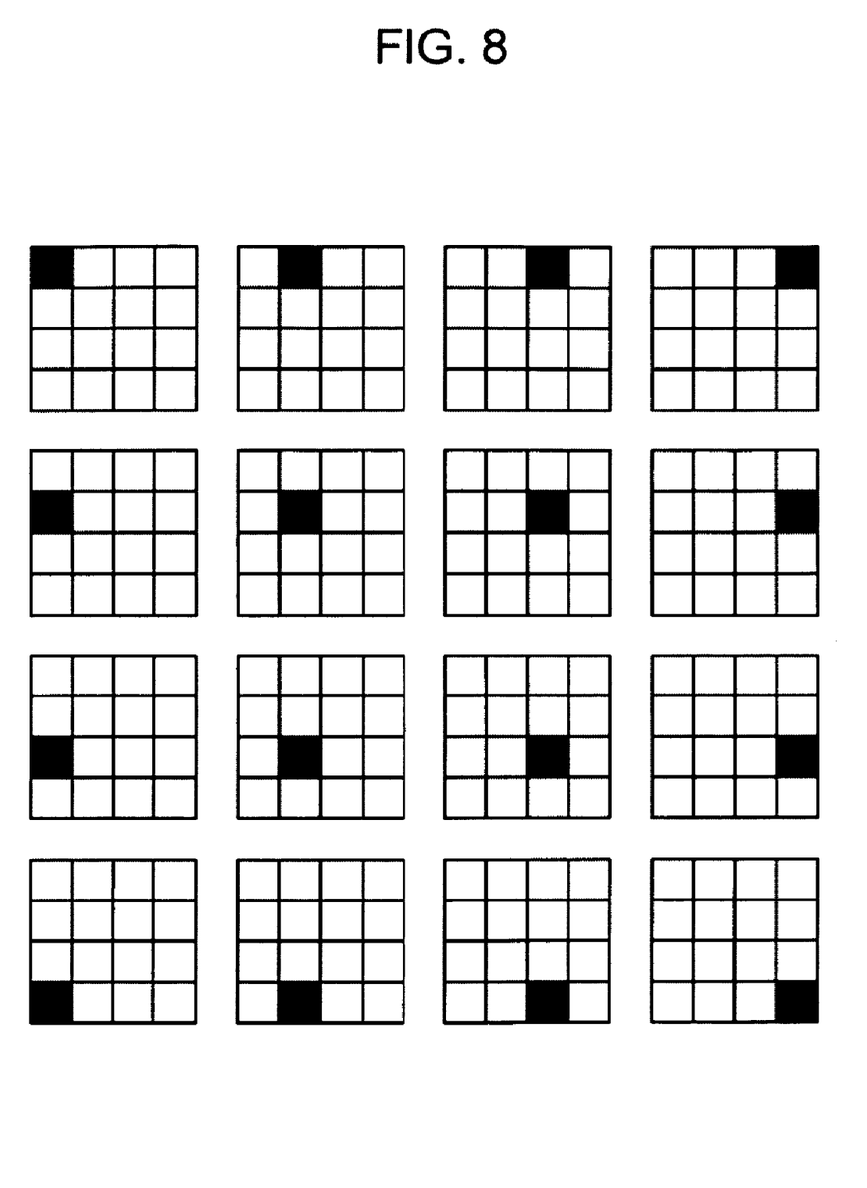
FIG. 8 is a diagram explaining another example of light emission patterns of the projector in FIG. 1.

In addition, for example, 16 light emission patterns shown in FIG. 8 may be stored. In each of the patterns, only one of the pixels does not emit light.

Figure 9:
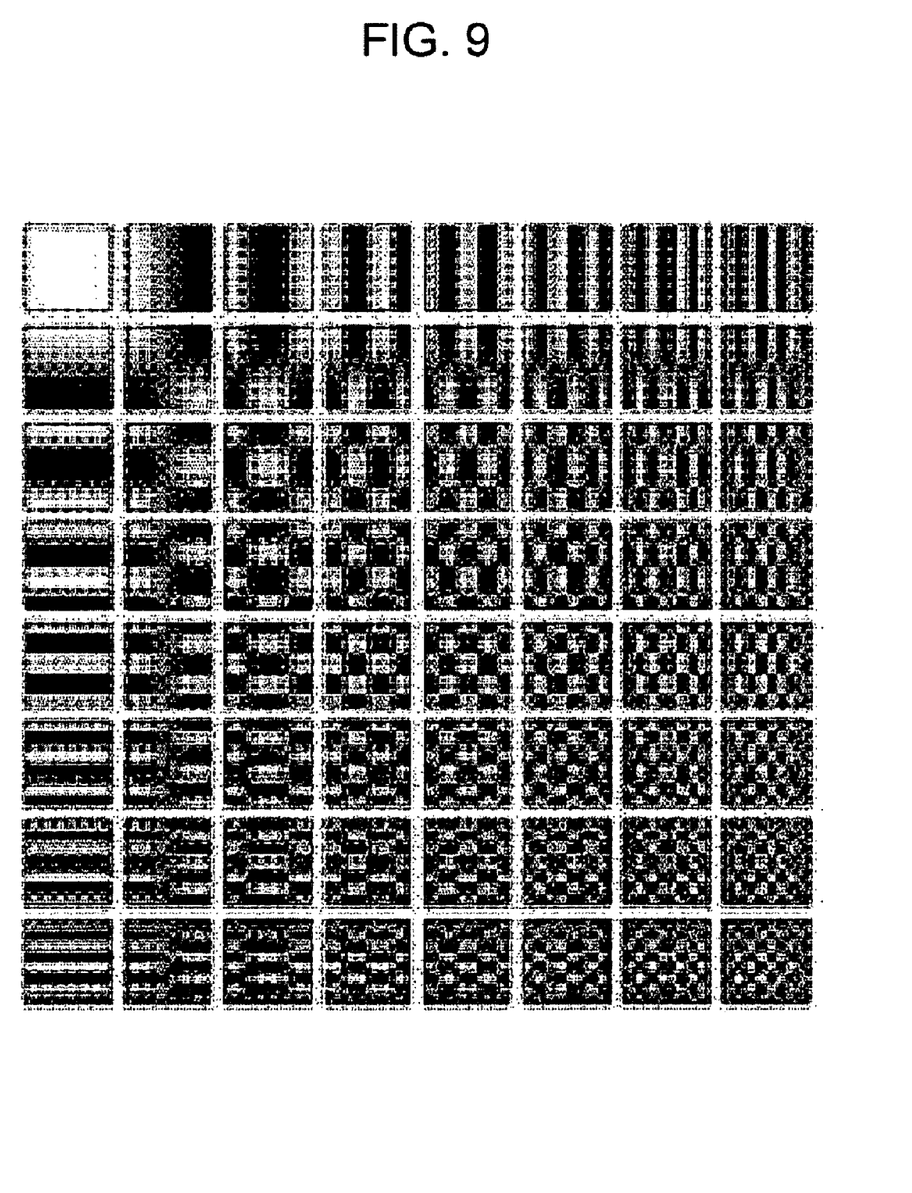
FIG. 9 is a diagram explaining another example of light emission patterns of the projector in FIG. 1.

Furthermore, for example, 64 two-dimensional DCT patterns shown in FIG. 9 may be used as light emission patterns.

In step S2, the pattern control unit 21 sets a counter C indicating the position of a pattern (not shown) to 1.

In step S3, the pattern control unit 21 generates a pattern whose position is the C-th indicated by the counter C in accordance with a predetermined order of the patterns read from the pattern memory 21a, instructs the projector 14 to emit light, and supplies the pattern to the measurement storage unit 23.

In step S4, the control unit 31 of the projector 14 controls the pixels 32 on the basis of a light emission instruction for the pattern supplied from the pattern control unit 21. The control unit 31 controls light emission of the pixels 32 so that light emission based on the supplied C-th pattern is performed.

Consequently, the projector 14 allows the pixels 32 to emit light in accordance with the C-th light emission pattern. The emitted light is reflected by the object 16.

In step S5, the sensor 44 of the spectrum measurement unit 15 receives light components obtained by diffracting light traveling from the lens 41 and the slit 42 through the concave grating 43, and supplies information regarding the light intensities of respective bands to the output unit 45. The output unit 45 generates spectral data on the basis of the supplied information regarding the light intensities of the bands and outputs the spectral data to the image processing apparatus 11. The measurement storage unit 23 in the image processing apparatus 11 receives the spectral data from the spectrum measurement unit 15 and stores the spectral data in association with the pattern supplied from the pattern control unit 21.

In step S6, the pattern control unit 21 determines whether the operation unit 22 is operated to stop the process of changing the pattern to the next one and displaying the next pattern, i.e., whether an instruction to stop this process (hereinafter, "instruction to stop pattern display") is given. Such an operation is performed so long as a user forcefully terminates the process, for example, when the number of light emission patterns is very large and a predetermined processing time has elapsed.

For instance, when it is determined in step S6 that the instruction to stop pattern display is not given, the pattern control unit 21 determines in step S7 whether all of the patterns have been displayed. If it is determined in step S7 that all of the patterns have not yet been displayed, the pattern control unit 21 increments the counter C by one in step S8. The process is returned to step S3.

In other words, the steps S3 to S8 are repeated until it is determined in step S6 that the operation unit 22 receives an instruction to stop pattern display, or it is determined in step S7 that all of the patterns have been displayed.

When it is determined in step S6 that the instruction to stop pattern display is given, the pattern control unit 21 stops generating a pattern. The process proceeds to step S9.

In step S9, the pattern control unit 21 instructs the transmission-rate calculation unit 24 to calculate the transmission rates. In response to the instruction, the transmission-rate calculation unit 24 reads the spectral data blocks and the associated patterns stored in the measurement storage unit 23 as the matrices P and C, calculates the above-described Expression (1) or (3) using the least-squares method to obtain the transmission rates A. The transmission-rate calculation unit 24 supplies the obtained transmission rates A to the image generation unit 25.

In step S10, the image generation unit 25 generates an image in a band, previously specified by the operation controller 13, using the transmission rates A and displays the generated image on the display unit 12.

When it is determined in step S7 that all of the patterns have been displayed, the process proceeds to step S9.

According to the above-described process, a spectrum measuring unit having a relatively simple structure can generate images equal in number to bands that can be obtained by dividing a spectrum through the spectrum measurement unit on the condition that the spectrum measurement unit in the position and direction as shown in FIG. 1 is used as a light source and a projector in the position and direction as shown in FIG. 1 is used as a camera.

It is assumed that all spectral data blocks of the patterns shown in FIG. 8 and spectral data obtained when all the pixels in the projector 14 emit light are obtained. Spectral data, obtained by subtracting spectral data of each pattern in FIG. 8 from the spectral data obtained when all the pixels emit light, is in theory identical to spectral data of the corresponding pattern in FIG. 7. However, physical noise easily occurs in measurements using the patterns in FIG. 7 because those measurements are performed in a darker state than measurements using the patterns shown in FIG. 8. Accordingly, when spectral data of each of the patterns each including one pixel that does not emit light is subtracted from the spectral data obtained when all the pixels emit light, noise generated in measurement can be reduced.

As described above, according to the present embodiment of the present invention, multiband images can be generated using a single photodetector.

The above-described series of text processing steps can be executed by hardware or software. When the above-described series of processing steps is executed by software, a program constituting the software is installed from a recording medium into a computer incorporated in dedicated hardware or into a multi-purpose personal computer which is capable of executing various functions by installing various programs.

Figure 10:
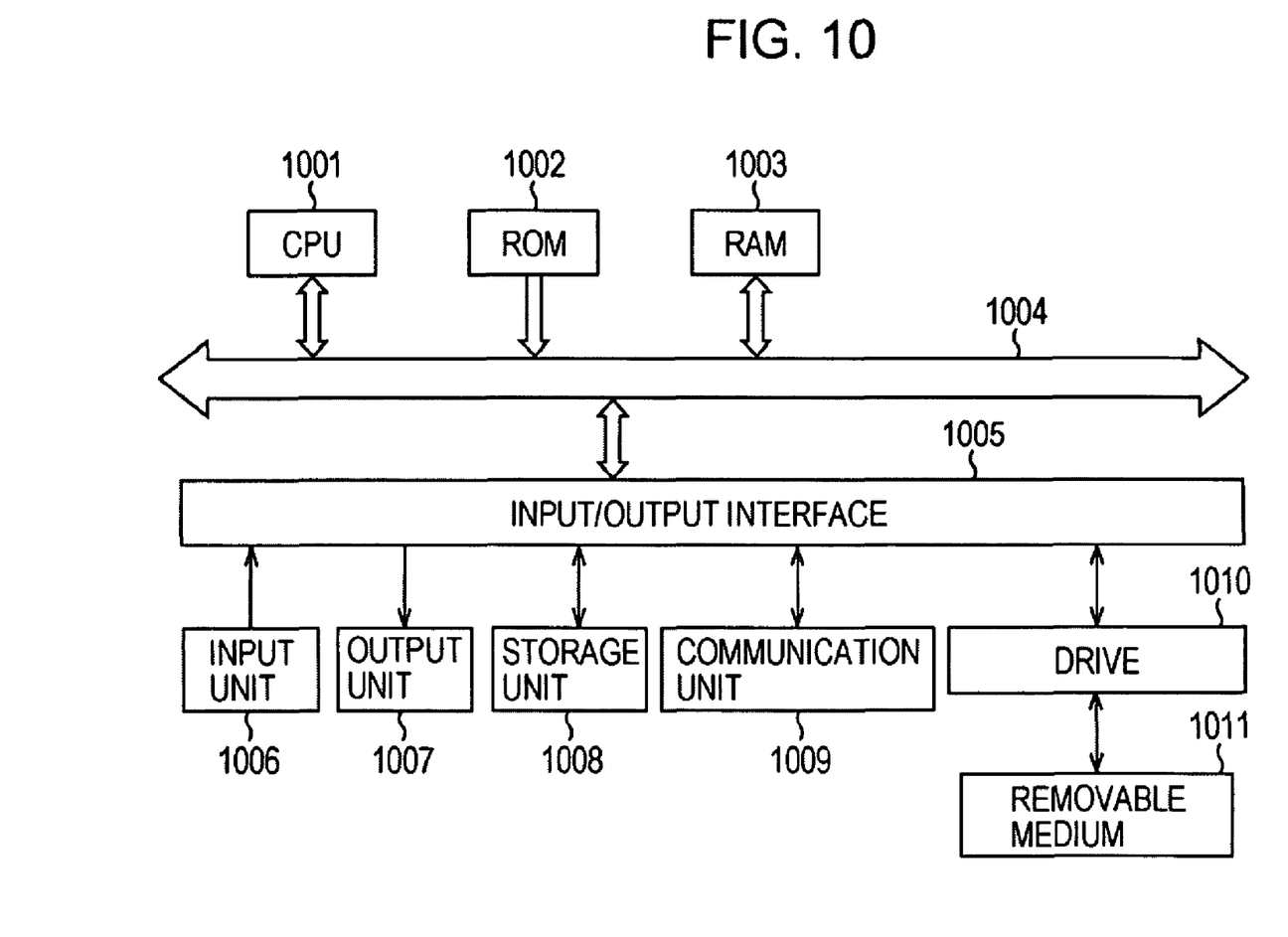
FIG. 10 is a diagram explaining the structure of a personal computer.

FIG. 10 illustrates the structure of a multi-purpose personal computer. The personal computer includes a central processing unit (CPU) 1001. The CPU 1001 is connected to an input/output interface 1005 via a bus 1004. The bus 1004 is connected to a read only memory (ROM) 1002 and a random access memory (RAM) 1003.

The input/output interface 1005 is connected to an input unit 1006, an output unit 1007, a storage unit 1008, and a communication unit 1009. The input unit 1006 has an input device including a keyboard and a mouse to which the user inputs an operation command. The output unit 1007 outputs an image indicative of a processing operation screen or a processing result to a display device. The storage unit 1008 includes a hard disk drive for storing a program and various data blocks. The communication unit 1009 includes a local area network (LAN) adapter and executes communication processing over a network, such as the Internet. In addition, the input/output interface 1005 is connected to a drive 1010 that reads and writes data from/to a removable medium 1011, such as a magnetic disk (including a flexible disk), an optical disk (e.g., a compact disc-read only memory (CD-ROM) or a digital versatile disk (DVD)), a magneto-optical disk (including a MiniDisc (MD)), or a semiconductor memory.

The CPU 1001 executes various processes in accordance with a program stored in the ROM 1002 or a program which is installed in the storage unit 1008 from the removable medium 1011, such as a magnetic disk, an optical disk, a magneto-optical disk, or a semiconductor memory, and is loaded in the RAM 1003 from the storage unit 1008. The RAM 1003 appropriately stores data necessary for execution of the various processes by the CPU 1001.

In this specification, steps describing the program stored in a recording medium include not only processing in which the steps are carried out in time series in the described order but also processing in which the steps are carried out in parallel or individually rather than being implemented in time series.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
    pattern generating means that generates a plurality of two-dimensional array patterns;
    radiating means that emits light in each of the two-dimensional array patterns generated by the pattern generating means to irradiate an object with the light;
    spectrum measuring means that measures the spectrum of the light, which is emitted from the radiating means and is reflected by the object, in a plurality of frequency bands to generate spectral data;
    transmission-rate calculating means that calculates the transmission rate of each frequency band on the basis of the two-dimensional array patterns and spectral data blocks associated with the respective two-dimensional array patterns; and
    image generating means that generates an image in a desired frequency band on the basis of the transmission rates calculated by the transmission-rate calculating means,
    wherein the transmission-rate calculating means calculates the transmission rate of each frequency band using a least-squares method on the basis of the two-dimensional array patterns and spectral images corresponding to the respective two-dimensional array patterns.

2. The apparatus according to claim 1, wherein the radiating means sequentially emits light in the two-dimensional array patterns generated by the pattern generating means in order to irradiate the object with the light.

3. A method for image processing, comprising the steps of:
    generating a plurality of two-dimensional array patterns;
    emitting light in each of the two-dimensional array patterns to irradiate an object with the light;
    measuring the spectrum of the light, which is emitted and is then reflected by the object, in a plurality of frequency bands to generate spectral data;
    calculating the transmission rate of each frequency band on the basis of the two-dimensional array patterns and spectral data blocks associated with the respective two-dimensional array patterns; and
    generating an image in a desired frequency band on the basis of the calculated transmission rates,
    wherein the calculating the transmission rate step includes calculating the transmission rate of each frequency band using a least-squares method on the basis of the two-dimensional array patterns and spectral images corresponding to the respective two-dimensional array patterns.

4. A computer program comprising programming instructions stored in a non-transitory computer readable medium, wherein the computer program, when executed on a computer allows the computer to perform a process comprising the steps of:
    generating a plurality of two-dimensional array patterns;
    emitting light in each of the two-dimensional array patterns to irradiate an object with the light;
    measuring the spectrum of the light, which is emitted and is then reflected by the object, in a plurality of frequency bands to generate spectral data;
    calculating the transmission rate of each frequency band on the basis of the two-dimensional array patterns and spectral data blocks associated with the respective two-dimensional array patterns; and
    generating an image in a desired frequency band on the basis of the calculated transmission rates,
    wherein the calculating the transmission rate step includes calculating the transmission rate of each frequency band using a least-squares method on the basis of the two-dimensional array patterns and spectral images corresponding to the respective two-dimensional array patterns.

5. A non-transitory computer program storage medium that stores the computer program according to claim 4.

6. An image processing apparatus, comprising:
    a pattern generating unit that generates a plurality of two-dimensional array patterns;
    a radiating unit that emits light in each of the two-dimensional array patterns generated by the pattern generating unit to irradiate an object with the light;
    a spectrum measuring unit that measures the spectrum of the light, which is emitted from the radiating unit and is reflected by the object, in a plurality of frequency bands to generate spectral data;
    a transmission-rate calculating unit that calculates the transmission rate of each frequency band on the basis of the two-dimensional array patterns and spectral data blocks associated with the respective two-dimensional array patterns; and
    an image generating unit that generates an image in a desired frequency band on the basis of the transmission rates calculated by the transmission-rate calculating unit,
    wherein the transmission-rate calculating means calculates the transmission rate of each frequency band using a least-squares method on the basis of the two-dimensional array patterns and spectral images corresponding to the respective two-dimensional array patterns.

* * * * *